United States Patent
Ogawa et al.

(10) Patent No.: US 7,183,668 B2
(45) Date of Patent: Feb. 27, 2007

(54) GENERATOR WITH CURRENT AND VOLTAGE ABNORMALITY DETECTION

(75) Inventors: Makoto Ogawa, Saitama (JP); Junichi Eguchi, Saitama (JP); Tsutomu Hirano, Saitama (JP); Toshio Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 35 days.

(21) Appl. No.: 11/135,290

(22) Filed: May 24, 2005

(65) Prior Publication Data

US 2005/0264961 A1    Dec. 1, 2005

(30) Foreign Application Priority Data

May 25, 2004    (JP)    ............................. 2004-154778

(51) Int. Cl.
- *H02J 1/10*    (2006.01)
- *H02J 7/34*    (2006.01)
- *H02J 3/30*    (2006.01)
- *H02P 9/00*    (2006.01)
- *H02P 3/00*    (2006.01)

(52) U.S. Cl. ........................... 307/43; 307/57; 307/68; 307/84; 322/90; 318/495; 318/523

(58) Field of Classification Search ................ 307/43, 307/57, 68, 64; 322/90; 318/495, 523
See application file for complete search history.

(56) References Cited

U.S. PATENT DOCUMENTS

| | | | |
|---|---|---|---|
| 4,460,834 A * | 7/1984 | Gottfried | 307/64 |
| 5,093,611 A * | 3/1992 | Nakamura et al. | 322/90 |
| 6,275,012 B1 * | 8/2001 | Jabaji | 322/22 |
| 6,504,346 B2 * | 1/2003 | Nakamura et al. | 322/90 |
| 6,630,804 B2 * | 10/2003 | Moriya et al. | 318/85 |

FOREIGN PATENT DOCUMENTS

JP    2511843    7/1996

* cited by examiner

*Primary Examiner*—Lynn Feild
*Assistant Examiner*—Michael Rutland-Wallis
(74) *Attorney, Agent, or Firm*—Westerman, Hattori, Daniels & Adrian, LLP.

(57) ABSTRACT

A detecting means easily detects the abnormality of a generator having a plurality of power supply units. Each of the power supply units includes one of a plurality of output windings L1 to L4, which are wound independently of each other around single iron core, and one of rectifiers 2 to 5 that are provided in correspondence to the output windings and produces an integrated output. Controllers 33 to 35 control the rectifiers such that the output voltage corresponds with a target. A voltage deviation judgment section 37 outputs the abnormal signal when one of the output voltages of the rectifiers 2 to 5 is different from remains. A current deviation judgment section 39 outputs the abnormal signal when one of the output currents of the rectifiers 2 to 5 is different from remains. When the abnormal signal is detected, the outputs of the rectifiers 2 to 5 are stopped.

5 Claims, 3 Drawing Sheets

GENERATOR WITH CURRENT AND VOLTAGE ABNORMALITY DETECTION

BACKGROUND OF THE INVENTION

1. Field of the Invention

The present invention relates to a generator and, in particular, to a generator capable of outputting a comparatively large direct current and detecting the occurrence of an abnormality with ease.

2. Description of the Related Art

A generator driven by an engine or the like has been conventionally widely employed as the power supply of an electric appliance especially used for outdoor works and for leisure-time activities. Further, in recent years, the uses of the generator are spreading also to the back-up power supply, that is, the so-called uninterruptible power supply (UPS) for computers and the like. When the generator of this kind is constructed as a generator for outputting a direct current, there is a tendency that the generator is required to be small in size and to be able to output a comparatively low voltage and a large current. In the generator required to output a large current like this, a larger size of wire for an output winding is needed and a higher level of consideration is required to be given also to a dielectric breakdown voltage between windings and a material for insulator.

Hence, the present applicant proposed a generator that could be reduced in the wire diameter of an output winding and could be reduced in the capacity of a power device (Japanese Utility Model Registration No. 2511843). In a device in accordance with this registered utility model, a plurality of power supply units independent of each other are formed, respectively, of a plurality of output windings that are wound independently of each other around the same iron core and thyristor bridge rectifier circuits connected to the plurality of output windings, and the outputs of the power supply units are connected in parallel, thereby being integrated into one output.

In the device disclosed in the above patent document, a plurality of power supply units that have a power generating source in common are connected in parallel. Hence, there is presented a problem that when an abnormality occurs in any one of the plurality of power supply units, it is not easy to find the occurrence of the abnormality by a detecting system on the output side of the generator.

SUMAMRY OF THE INVENTION

The object of the present invention is to provide a generator capable of solving the above problem and detecting an abnormality in a plurality of power supply units with ease and with reliability.

The first characteristic of the present invention is that a generator so constructed as to have a plurality of power supply units which are independent respectively and each of which has one of a plurality of output windings that are wound independently of each other around a single iron core and each of which has a rectifier circuit including a rectifier device with control terminals connected to respective phases of one of the plurality of output windings, wherein the plurality of power supply units are connected in parallel so as to integrate their outputs into one output, current detecting means that detects an output current of each of the rectifier circuits, current judgment means that examines each of the output currents detected by the current detecting means and out puts a current abnormality detecting signal when a difference between one of the output currents and at least one of the other remaining output currents is larger than a predetermined value; and output stopping means that stops outputs of all of the rectifier circuits in response to the current abnormality detecting signal.

The second characteristic of the present invention is that a generator so constructed as to have a plurality of power supply units which are independent respectively and each of which has one of a plurality of output windings that are wound independently of each other around a single iron core and each of which has a rectifier circuit including a rectifier device with control terminals connected to respective phases of one of the plurality of output windings, wherein the plurality of power supply units are connected in parallel so as to integrate their outputs into one output, voltage detecting means that detects an output voltage of each of the rectifier circuits, voltage judgment means that examines each of the output voltages detected by the voltage detecting means and outputs a voltage abnormality detecting signal when a difference between one of the output voltages and at least one of the other remaining output voltages is larger than a predetermined value; and output stopping means that stops outputs of all of the rectifier circuits when the voltage judgment means detects an abnormality.

The third characteristic of the present invention is that said generator further comprising means that stops the engine when at least one of the current detecting means still detects an output current after the output stopping means stops outputs of the rectifier circuits.

According to the present invention, it is possible to detect an abnormality with ease by determining whether or not the outputs of the rectifier circuits of the plurality of power supply units are different from each other. In particular, according to the first characteristic, when a load is applied, it is possible to detect an abnormality on the basis of the output currents of the rectifier circuits. Moreover, according to the second characteristic, even in a case where a current is not detected when a load is not applied, it is possible to detect an abnormality on the basis of the output voltages of the rectifier circuits.

According to the third characteristic of the present invention, when an abnormality is detected, it is possible to stop the outputs of the plurality of rectifier circuits at the same time with ease and with reliability.

DETAILED DESCRIPTION OF THE PREFERRED EMBODIMENTS

Figure 1:
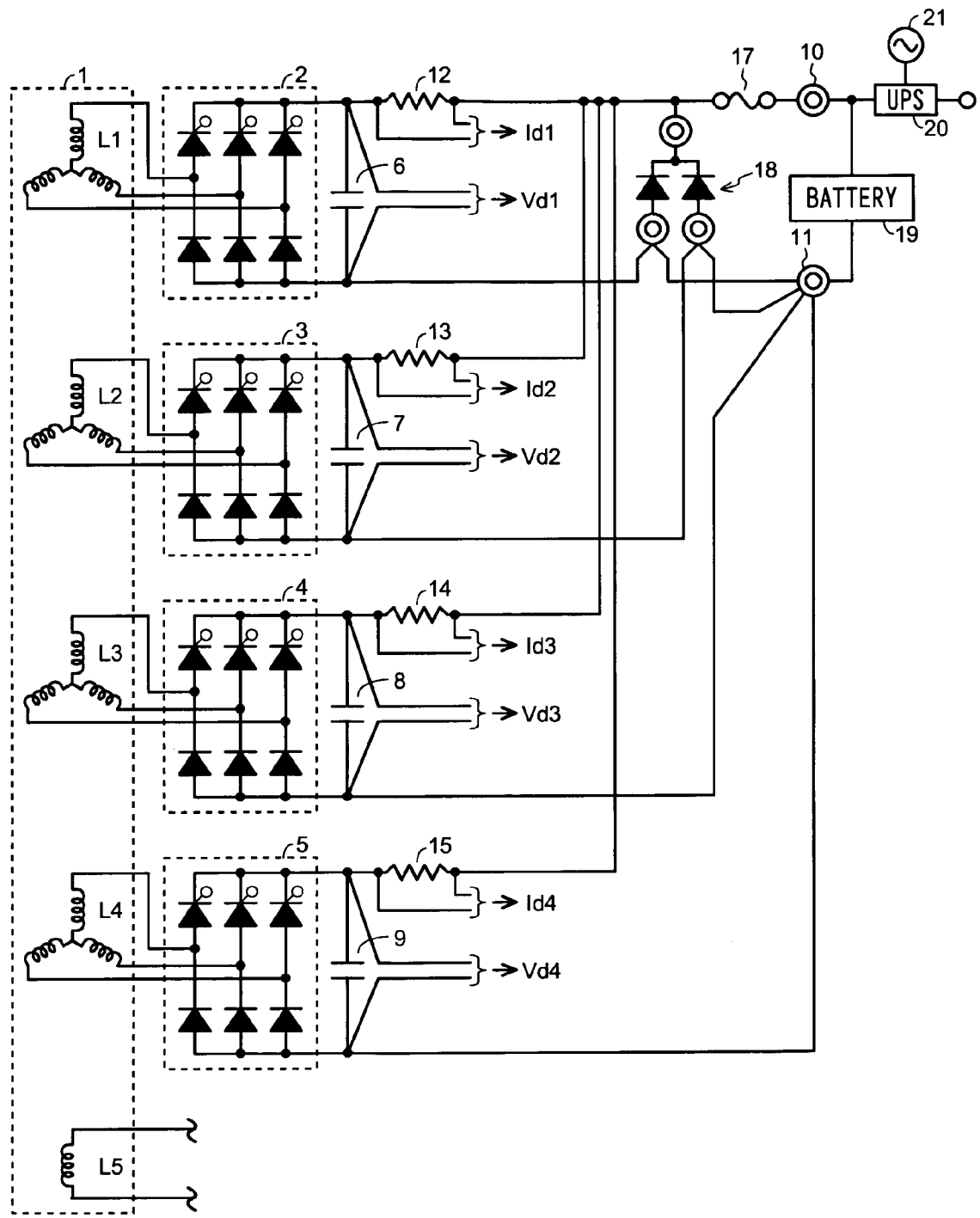
FIG. 1 is a connection diagram (No. 1) relating to the main portion of a generator in accordance with an embodiment of the present invention.

An embodiment of the present invention will be described below in detail with reference to the drawings. FIG. 1 is a construction diagram of the main portion of a portable generator in accordance with an embodiment of the present invention. In FIG. 1, the stator 1 of a generator body consists of four output windings L1, L2, L3, and L4 those are independent of each other and an auxiliary winding L5 independent of these output windings L1 to L4, wherein the four output windings L1, L2, L3, and L4 and the auxiliary winding L5 are wound around the protruding poles of a single stator iron core (not shown). The output windings L1 to L4 are equal to each other in the number of windings and in the diameter of the wire, that is, identical in specifications.

The stator 1 is disposed in the center of the generator body and a rotor having a plurality of magnets disposed annularly, that is, an outer rotor is commonly arranged on the outer periphery of the stator 1. The rotor is connected to a driving unit (that is here thought to be an engine) and is driven by the engine so as to rotate along the outer periphery of the stator 1.

The output windings L1, L2, L3, and L4 are connected to three-phase rectifier bridge circuits 2, 3, 4, and 5, respectively, each of which is constructed of rectifier devices having control terminals (thyristors) and diodes. Symbols showing the thyristors and the diodes in the drawing are well known and hence are not denoted by reference numerals for the purpose of avoiding the drawings from being complicated. Smoothing capacitors 6, 7, 8, and 9 are provided on the outsides of the three-phase rectifier bridge circuits 2, 3, 4, and 5, respectively. The plus-side output lines of the three-phase rectifier bridge circuits 2, 3, 4, and 5 are integrated into one line and connected to a plus-side output terminal 10 and the minus-side output lines thereof are integrated into one line and connected to a minus-side output terminal 11.

Shunts 12, 13, 14, and 15 are connected to the respective plus-side output lines before the plus-side output lines are integrated into one line. A potential difference across both ends of each of the shunts 12, 13, 14, and 15 is inputted as a signal showing each of output currents Id1, Id2, Id3, and Id4 of the three-phase rectifier circuits 2, 3, 4, and 5 to a microcomputer, that is, a controller 16 (see FIG. 2). A potential difference across both ends of each of the capacitors 6, 7, 8, and 9 is inputted as each of output voltages Vd1, Vd2, Vd3, and Vd4 of the three-phase rectifier circuits 2, 3, 4, and 5 to the controller 16.

A fuse 17 is provided in a line into which the respective plus-side output lines are integrated. The fuse 17 is selected so as to allow the maximum value of the added value of the respective output currents of the three-phase rectifier bridge circuits 2, 3, 4, and 5. A diode 18 is interposed between the upstream side of the fuse 17 of the one line, into which the plus-side output lines are integrated, and at least one line (two lines in the example shown in FIG. 1) of the four minus-side output lines. For example, when a battery 19 of a load is connected in reverse polarity by mistake, a current from a load side passes through one line, into which the output lines are integrated, via this diode 18. Hence, this can prevent a current from passing from a load connected in reverse polarity to the respective three-phase rectifier bridge circuits 2 to 5 having a smaller allowable current than these output lines.

The battery 19 and a UPS 20 are connected to the output terminal 10 on the plus side and the output terminal 11 on the minus side. The output side of the UPS 20 is connected to an electronic unit (not shown), for example, a computer system. A commercial AC power supply 21, for example, is connected to the UPS 20 and the battery 19 is always charged with this commercial AC power supply 21. The portable generator of the present embodiment is connected to the UPS 20 to supply the UPS 20 and the battery 19 with power in the event of a failure of the commercial AC power supply 21 or the like. Batteries of different rated voltages of 48 V and 36 V, for example, can be selectively connected as the battery 19.

Figure 2:
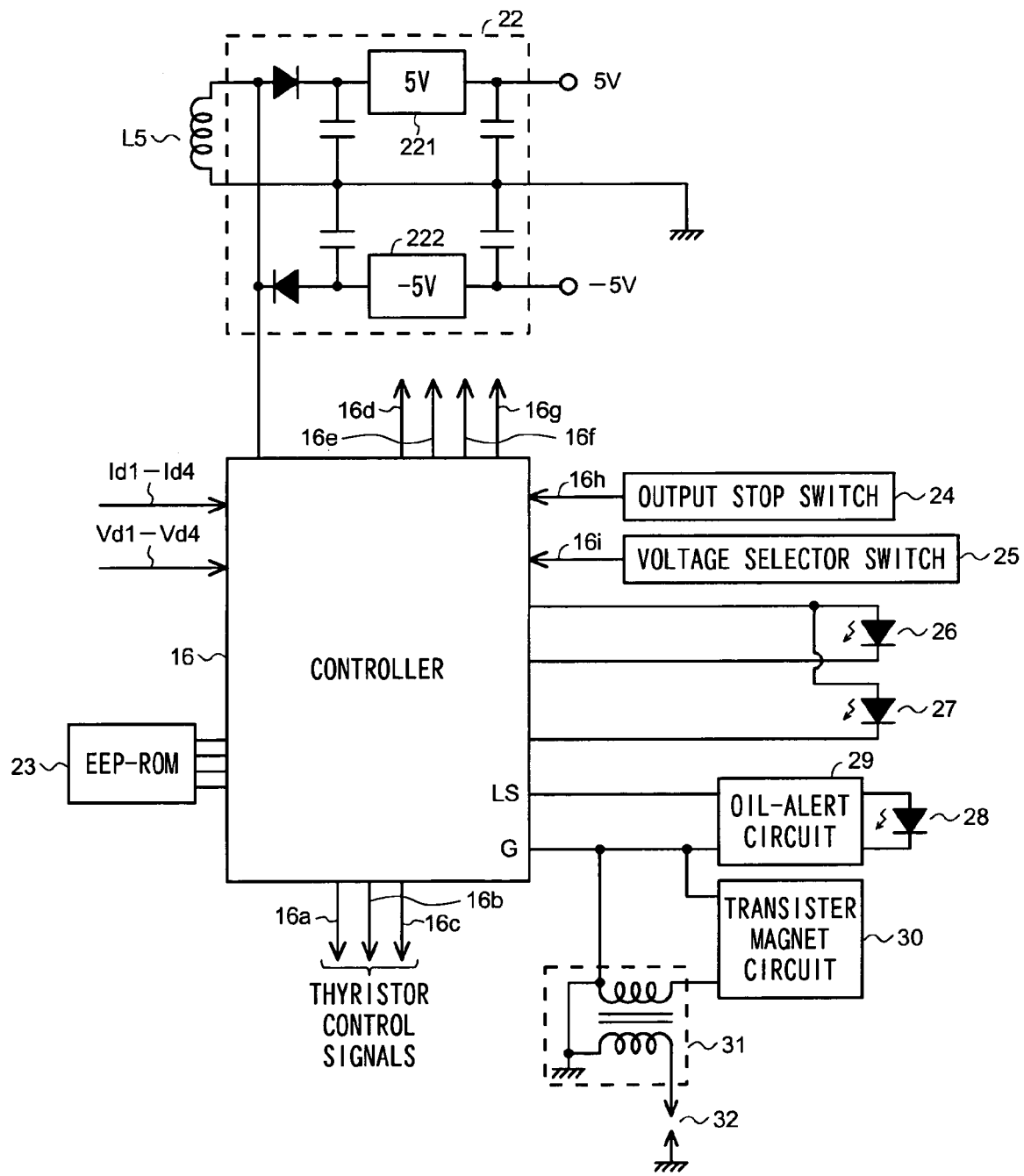
FIG. 2 is a connection diagram (No. 2) relating to the main portion of the generator in accordance with the embodiment of the present invention.

FIG. 2 is a connection diagram of a controller and its peripheral parts. The auxiliary winding L5 is connected to a constant-voltage circuit 22. The constant-voltage circuit 22 includes positive/negative (+5 V and −5 V) regulators 221, 222 with three terminals and generates DC power supply voltages stabilized at +5 V and −5 V by the voltage applied by the auxiliary winding L5. These DC power supply voltages are used as the power supply of the controller 16. Moreover, the output waveform of the auxiliary winding L5 is supplied as a signal for detecting the rotation of the rotor of the generator body to the controller 16. An EEP-ROM 23 for storing data used by the controller 16 is connected to the controller 16.

The controller 16 outputs thyristor control signals (gate pulses) 16a, 16b, and 16c for turning on and off the respective thyristors of each of the three-phase rectifier bridge circuits 2, 3, 4, and 5, as shown in FIG. 1. These gate pulses 16a, 16b, and 16c are supplied to the gate terminals, that is, the control terminals of the respective thyristors. Each of the three-phase rectifier bridge circuits 2, 3, 4, and 5 is provided with three thyristors corresponding to the respective phases U, V, and W of each of the output windings L1 to L4, and the thyristors corresponding to the respective phases are controlled by these gate pulses 16a, 16b, and 16c common to the three-phase rectifier bridge circuits 2, 3, 4, and 5. Hence, the three-phase rectifier bridge circuits 2, 3, 4, and 5 are controlled in synchronization with each other by the gate pluses 16a, 16b, and 16c.

To control the opening or closing of the throttle valve of the engine for driving the outer rotor by a stepping motor (not shown), the controller 16 outputs motor driving signals 16d, 16e, 16f, and 16g to this stepping motor.

An output stop switch 24 is a switch for stopping the portable generator in this embodiment from outputting generated power. When this output stop switch 24 is held pressed for a predetermined time, the gate pulses 16a, 16b, and 16c are stopped by the ON signal 16h of this switch 24, whereby the outputting of power is stopped. However, only the outputting of the generated power is stopped by this operation of the output stop switch 24 and the engine is not stopped only by the operation of this output stop switch 24.

A voltage selector switch 25 is a switch for setting an output voltage according to a connected load (battery 19 or the like). For example, when the voltage selector switch 25 is turned ON (selecting signal 16i is ON), a voltage of 36 V is set as an output voltage, and when the voltage selector switch 25 is turned OFF (selecting signal 16i is OFF), a voltage of 48 V is set as an output voltage.

There are provided an output indicating light 26, an overload indicating light 27, and an oil-alert indicating light 28. The oil-alert indicating light 28 is connected to the controller 16 through an oil-alert circuit 29. The output indicating light 26 is turned on while power is generated and outputted. The overload indicating light 27 is turned on in the case of an overload, that is, in the case of an over-current or an over-voltage.

There is provided a circuit section 30 of a transistor type magnet ignition unit. A well-known unit can be used as the main portion of the transistor type magnet ignition unit. The grounding line of the circuit section 30 of a transistor type magnet ignition unit and the grounding line of the oil-alert circuit 29 are connected to the terminal G of the controller 16. The other line of the circuit section 30 is connected to the coil part 31 of the ignition unit. An ignition plug 32 is connected to the secondary side of the coil part 31. The other terminal of the oil-alert circuit 29 is connected to the terminal LS of the controller 16. The terminals G and LS of the controller 16 are constructed to be short-circuited in the controller 16 so as to stop ignition.

The operation of the generator body will be described. The generator is started by the use of a recoil starter coupled to the engine of the driving source of the generator. When the recoil starter is pulled, the crankshaft of the engine is rotated and hence the rotor coupled to the crankshaft is rotated to develop a voltage in the auxiliary winding L5, and this voltage develops a predetermined voltage in the constant-voltage circuit 22. When the controller 16 has this voltage applied thereto, the controller 16 can start a controlling operation.

When the engine is rotated by the recoil starter, the engine is ignited by the ignition unit, whereby the generator is started. The windings L1 to L4 and L5 of the generator start generating power and the generated powers are integrated and outputted as generated power from the output terminals 10, 11. This power is supplied to the battery 19 and the UPS 20.

When the generated power is outputted, the output indicating light 26 is energized. Further, in the event of an over-current or an over-voltage, the overload indicating light 27 is energized. Still further, when it is determined by a well-known method that the oil of the engine is decreased to a level lower than a predetermined required value, the oil-alert circuit 29 is operated to energize the oil-alert indicating light 28. For example, the oil-alert circuit 29 is a switching circuit constructed such that a current passes through the oil-alert indicating light 28 according to a signal from the terminal LS. Further, when the oil decreases or an abnormality occurs in the power generating system, which will be described later, the controller 16 short-circuits the terminals LS and G in the controller 16 to stop igniting.

In this embodiment, the outputs of four power generating sections (power supply units) each including the windings and the rectifier circuit are integrated, that is, superimposed to the final output. When an abnormality occurs in the individual power supply units, the abnormality can be coped with in the following manner.

Figure 3:
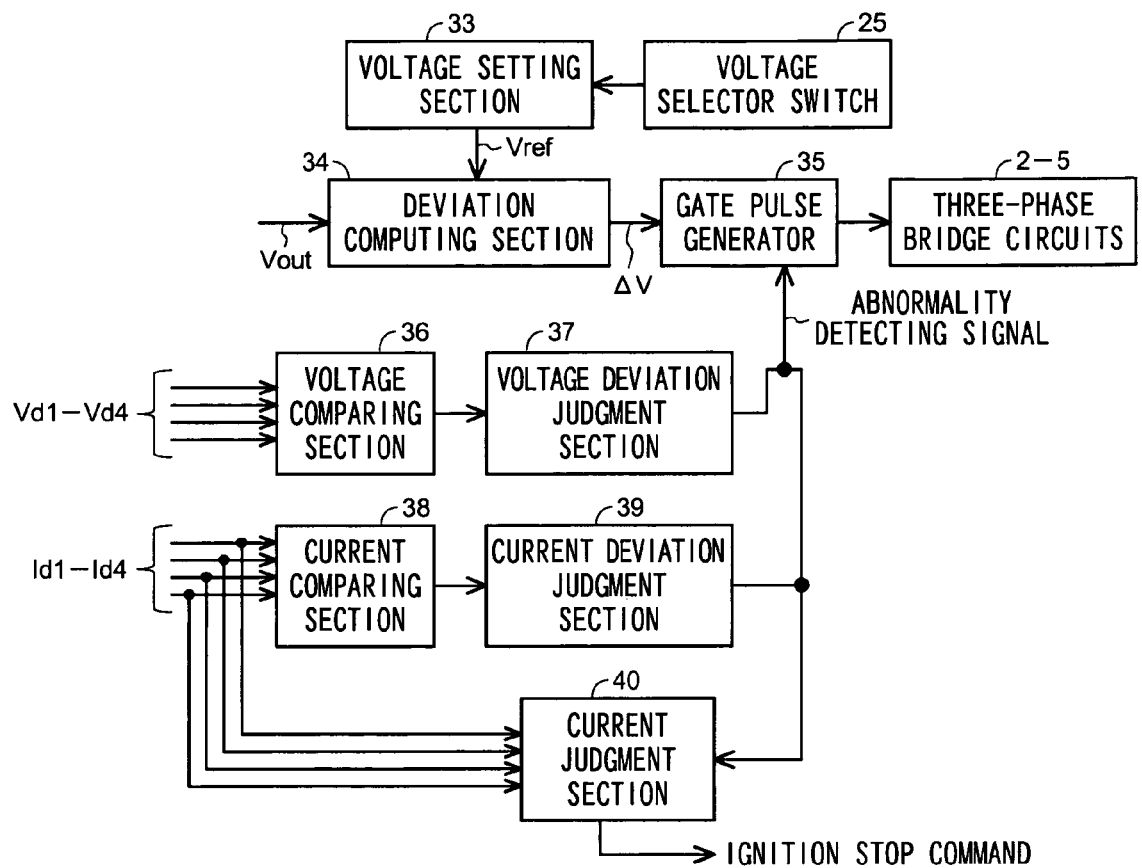
FIG. 3 is a block diagram showing the main function of control section of the generator in accordance with the embodiment of the present invention.

FIG. 3 is a block diagram showing the function of the controller 16 to cope with the abnormality. In a voltage setting section 33, a target value Vref of the output voltage Vout of the generator (voltage across the terminals 10 and 11) is previously set and stored. The target value Vref is switched according to the selection of the voltage selector switch 25. A deviation computing section 34 computes a deviation ΔV of the output voltage Vout of the generator with respect to the target value Vref inputted by the voltage setting section 33. The output voltage Vout can be typified by any one of the voltages Vd1, Vd2, Vd3, and Vd4. The computed deviation ΔV is inputted to a gate pulse generator 35. The gate pulse generator 35 has a proportion control function of determining a gain proportional to this deviation ΔV so as to cancel the deviation ΔV. The gate pulse generator 35 determines the conduction angle of the thyristor according to this gain and produces a gate pulse corresponding to this conduction angle. This gate pulse is supplied to the three-phase bridge circuits 2, 3, 4, and 5, whereby the thyristors of the three-phase bridge circuits 2, 3, 4, and 5 are controlled at the same time.

A voltage comparing section 36 compares the output voltages Vd1, Vd2, Vd3, and Vd4 of the three-phase bridge circuits 2, 3, 4, and 5 to compute the differences between them. A voltage deviation judgment section 37 determines whether or not the differences between the output voltages Vd1, Vd2, Vd3, and Vd4 computed by the voltage comparing section 36 are within a predetermined range and outputs an abnormality detecting signal when at least one of the differences is out of the planed range. That is, when one of the voltages Vd1, Vd2, Vd3, and Vd4 is largely different from at least one of the remaining differences, the voltage deviation judgment section 37 determines that an abnormality such as a break in the wiring occurs in any one of the power generating systems and outputs an abnormality detecting signal.

The determination of an abnormality by the difference between the voltages is useful in that the abnormality can be detected even when a current cannot be detected in the case of no-load operation.

A current comparing section 38 compares the output currents Id1, Id2, Id3, and Id4 of the three-phase bridge circuits 2, 3, 4, and 5 to compute the differences between them. A current deviation judgment section 39 determines whether or not the differences between the output currents Id1, Id2, Id3, and Id4 computed by the current comparing section 38 are within a predetermined range and outputs an abnormality detecting signal when at least one of the differences is out of the predetermined range. That is, when one of the currents Id1, Id2, Id3, and Id4 is largely different from at least one of the remaining differences, the current deviation judgment section 39 determines that an abnormality occurs in any one of the power generating systems and outputs an abnormality detecting signal.

In this regard, the determination of an abnormality is not performed by comparing the output voltages or the output currents of the three-phase bridge circuits 2, 3, 4, and 5, but may be performed by determining whether or not the voltages and the currents are within a predetermined voltage range or a predetermined current range which are base ranges.

The abnormality detecting signal is inputted to a gate pulse generator 35 from each of the voltage deviation judgment section 37 and the current deviation judgment section 39. When the abnormality detecting signal is inputted to the gate pulse generator 35, the gate pulse generator 35 stops outputting the gate pulse, in other words, the outputs of the three-phase bridge circuits 2, 3, 4, and 5 are stopped.

The abnormality detecting signal is inputted also to a current judgment section 40. When the current judgment section 40 has the abnormality detecting signal inputted thereto, the current judgment section 40 determines whether or not the currents Id1 to Id4 exist. When the current is detected, the igniting of the engine is stopped. The igniting of the engine is stopped by short-circuiting the terminals LS and G of the controller 16.

In this embodiment, when an abnormality is detected in any one of the output current and the output voltage, the output of the rectifier circuit is stopped, and when it is detected that the output current still passes, an ignition stop command is provided.

In this manner, according to the present embodiment, it is possible to detect the abnormality of the respective power supply units with ease and with reliability and to stop their outputs.

What is claimed is:

1. A generator comprising:
    a plurality of power supply units which are independent respectively and each of which has one of a plurality of output windings that are wound independently of each other around a single iron core and each of which has a rectifier circuit including a rectifier device with control terminals connected to respective phases of one of the plurality of output windings, wherein the plurality of power supply units are connected in parallel so as to integrate their outputs into one output;

current detecting means that detects an output current of each of the rectifier circuits;

current judgment means that examines each of the output currents detected by the current detecting means and outputs a current abnormality detecting signal when a difference between one of the output currents and at least one of the other remaining output currents is larger than a predetermined value; and output stopping means that stops outputs of all of the rectifier circuits in response to the current abnormality detecting signal.

2. A generator comprising:

a plurality of power supply units which are independent respectively and each of which has one of a plurality of output windings that are wound independently of each other around a single iron core and each of which has a rectifier circuit including a rectifier device with control terminals connected to respective phases of one of the plurality of output windings, wherein the plurality of power supply units are connected in parallel so as to integrate their outputs into one output;

voltage detecting means that detects an output voltage of each of the rectifier circuits;

voltage judgment means that examines each of the output voltages detected by the voltage detecting means and outputs a voltage abnormality detecting signal when a difference between one of the output voltages and at least one of the other remaining output voltages is larger than a predetermined value; and output stopping means that stops outputs of all of the rectifier circuits when the voltage judgment means detects an abnormality.

3. The generator as claimed in claim 1 that drives a rotor corresponding to a stator provided with the output windings by an engine, further comprising means that stops the engine when at least one of the current detecting means still detects an output current after the output stopping means stops outputs of the rectifier circuits.

4. The generator as claimed in claim 1, wherein the output stopping means is a gate pulse generator constructed in such as way as to receive the current abnormality detecting signal and to stop supplying a gate pulse to the rectifier device.

5. The generator as claimed in claim 2, wherein the output stopping means is a gate pulse generator constructed in such as way as to receive the voltage abnormality detecting signal and to stop supplying a gate pulse to the rectifier device.

* * * * *